June 17, 1969　　　E. H. FRIEDMANN ET AL　　　3,449,983
FLUID TORQUE TRANSMITTER

Filed Sept. 30, 1966　　　　　　　　　　　Sheet 1 of 2

Eric Helmuth Friedmann,
Hendrik Concerinus,
Timothy Richard Trembath
and Philip John Gourie, Inventors By Wenderoth, Lind and Ponack,
Attorneys

United States Patent Office 3,449,983
Patented June 17, 1969

3,449,983
FLUID TORQUE TRANSMITTER
Eric Helmuth Friedmann, Kenilworth, Cape Province, Hendrik Cancrinus, Rondebosch, Cape Province, Richard Timothy Trembath, Plumstead, Cape Province, and John Philip Fourie, Tokai, Cape Province, Republic of South Africa, assignors to Inpower Works (Proprietary) Limited
Filed Sept. 30, 1966, Ser. No. 583,357
Claims priority, application Republic of South Africa, Oct. 1, 1965, 65/5,334
Int. Cl. F16h 3/74
U.S. Cl. 74—752                                           9 Claims

ABSTRACT OF THE DISCLOSURE

A liquid entrapping wheel having outwardly extending vanes of substantially C-section fast with and spaced circumferentially about a central boss, the vanes extending axially between axially spaced side walls, fluid rejection openings being provided at the boss, and leading out of recesses defined between adjacent vanes. A fluid torque transmitter which makes use of a liquid-entrapping wheel mounted to rotate on a rotatably mounted carrier, the liquid-entrapping wheel being fast with a planet wheel drivingly connected to a driven wheel co-axial with the carrier and rotatable relative thereto.

---

This invention relates to a liquid-entrapping wheel and a fluid torque transmitter.

According to the invention, there is provided a liquid-entrapping wheel having outwardly extending vanes of substantially C-section and fast with and spaced circumferentially about a central boss, the vanes extending axially between axially spaced side walls, recesses being defined between adjacent vanes, there being provided fluid rejection openings out of the recesses at the boss.

The fluid rejection openings may be in the form of vane openings leading through the vanes from one recess to another.

The fluid rejection openings may also be in the form of axial openings leading out of the recesses through at least one of the axially spaced side walls at the ends of the vanes.

If required, the fluid rejection openings may be in the form of vane openings leading through the vanes from one recess to another, as well as axial openings leading from the recesses through at least one of the axially spaced side walls at the ends of the vanes.

The vane openings may be in the form of a series of axially spaced vane openings through each vane, the openings through each vane conveniently being staggered axially relative to those through an adjacent vane.

Further according to the invention, there is provided a fluid torque transmitter including a carrier adapted for receiving a rotary power input and at least one planet wheel mounted on the carrier; a driven wheel co-axial with the carrier and drivingly connected to the planet wheel and adapted for connection to a power output; liquid-entrapping means which includes a liquid-entrapping wheel having outwardly extending vanes fast with and spaced circumferentially about a central boss which is co-axial and fast with the planet wheel, recesses being defined between adjacent vanes and axially spaced side walls being provided at the end of and fast with the vanes; a reservoir in the form of a drum around the liquid-entrapping wheels and co-axial with the carrier and adapted to contain hydraulic fluid; the liquid-entrapping means being arranged to entrap liquid in the recesses from a peripheral layer set up in the drum under rotation of the carrier and to displace such entrapped liquid towards the rotational axis of the carrier against the action of centrifugal force, there being provided fluid rejection openings out of the recesses at the boss for reducing the carry-over of entrapped liquid from one side to the other side of the liquid-entrapping wheel when it rotates, so as to ensure the entrapment of an unbalanced mass of liquid on one side of the liquid-entrapping wheel relative to the direction of rotation of the carrier about its axis.

The vanes may have leading lips and may be of forwardly curved section relative to the direction of rotation of the planet wheel about its axis relative to the carrier.

The invention will now be described by way of example with reference to the accompanying diagrammatic drawings.

Figure 1:
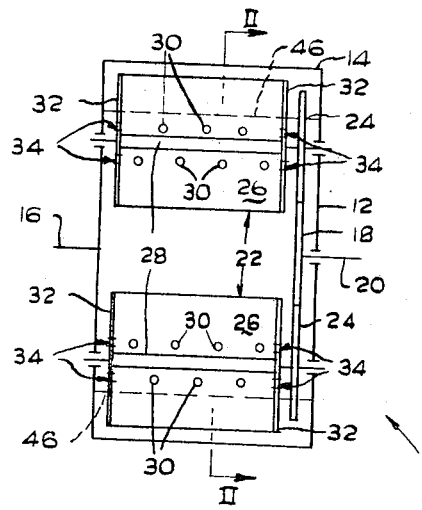
FIGURE 1 shows an axial section at I—I of FIGURE 2 of a fluid torque transmitter in the form of a fluid coupling.
Figure 2:
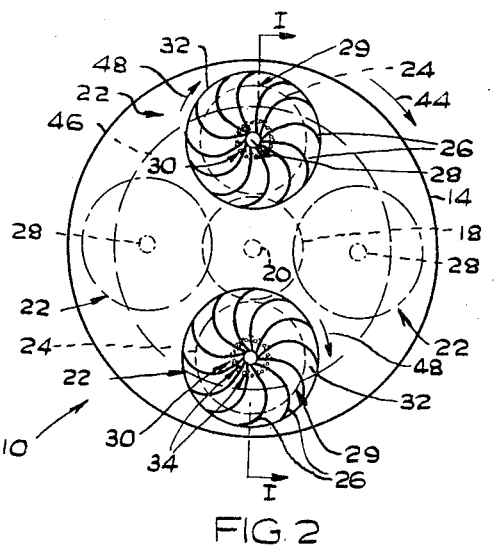
FIGURE 2 shows a cross-section at II—II in FIGURE 1.

Referring to FIGURES 1 and 2 of the drawings, reference numeral 10 refers to a coupling comprising a carrier 12 integral with a reservoir in the form of a drum 14, and input shaft 16 fast with the carrier 12, and a driven wheel in the form of a sun wheel 18 co-axial with the carrier 12 and input shaft 16, and having an output shaft 20 fast with it. The coupling further comprises liquid-entrapping wheels in the form of vane wheels generally indicated by reference numeral 22, mounted to rotate about axes spaced away from the carrier axis. These liquid-entrapping wheels are fast with toothed planet wheels 24 meshing with the driven sun wheel 18.

Figure 3:
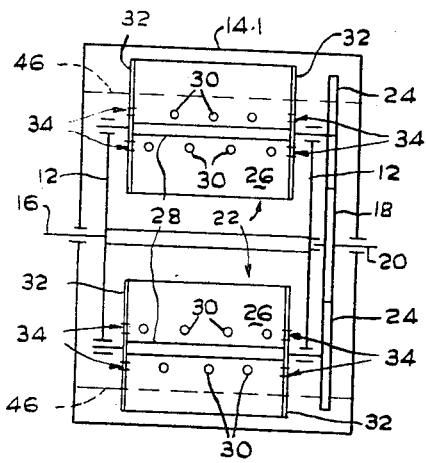
FIGURE 3 shows an axial section similar to FIGURE 1 of another embodiment of a torque transmitter in the form of a fluid coupling.

FIGURE 3 shows an alternative embodiment of a coupling in which the drum 14.1 is mounted to be rotatable relative to the carrier and co-axial with it. Otherwise the construction of FIGURE 3 is the same as that shown in FIGURES 1 and 2.

The liquid-entrapping wheels 22 may have curved vanes 26 fast at their inner edges with a central boss or shaft 28. Between adjacent vanes 26 recesses 29 are defined. The vanes have fluid rejection openings 30 through them at their roots. The vanes have side walls fast with their ends, further fluid rejection openings 34 being provided through the side walls at or near the boss or shaft 28. If desired, the boss or shaft 28 may be hollow for rotatable mounting on a fixed shaft. The liquid-entrapping wheels 22 are fast and co-axial with the planet wheels 24 meshing with the sun wheel 18. A liquid-entrapping wheel may have openings 34 only, or both types of fluid rejection openings 30 and 34.

Figure 4:
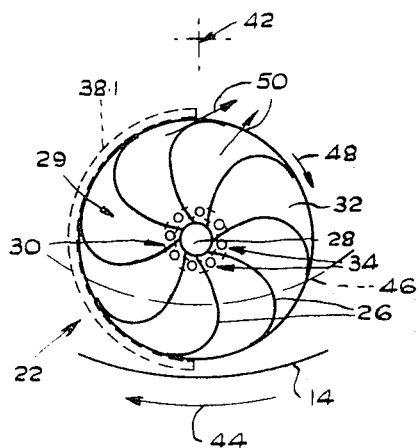
FIGURES 4 to 6 show cross-sectional view of different types of liquid-entrapping wheels.

FIGURE 4 shows in more detail, the vane wheel 22 shown in FIGURES 1, 2 and 3. In addition to the openings 34, there are provided fluid rejection openings 30 through the vanes, at or near the boss 28. The vanes 26 are curved and are spaced circumferentially between a pair of axially spaced side walls 32 having the fluid rejection openings 34. If desired, a shroud 38.1 may be provided circumferentially around the ends of the vanes 26 on the leading side of the planet wheel axis relative to the direction of rotation of the carrier about its axis.

Figure 5:
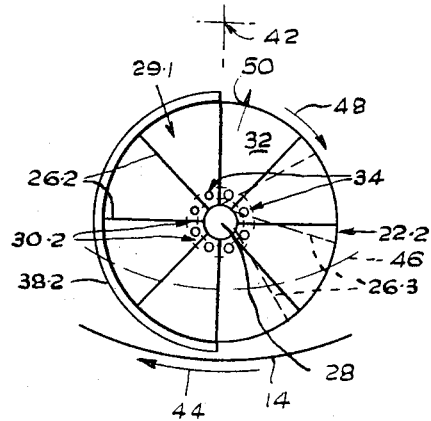

FIGURE 5 shows a further type of vane wheel 22.2 having straight vanes 26.2 extending between axially spaced side walls 32 having fluid rejection openings 34. Recesses 29.1 are defined between adjacent vanes 26.2. Fluid rejection openings 30.2 are provided through the vanes 26.2 at or near the boss 28. A circumferential shroud 38.2 is provided around the periphery of the vane wheel on its leading side. The vanes 26.2 are shown to be radial. If desired, the vanes may be inclined to a radius by way of example, as shown dotted at 26.3.

Figure 6:
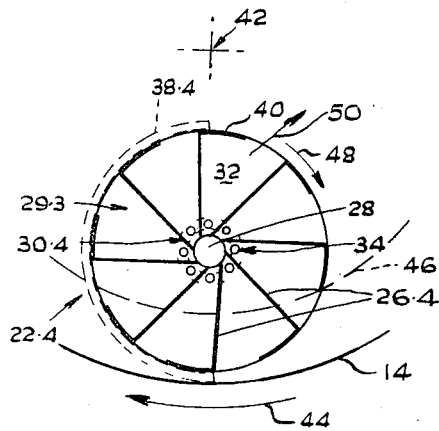

FIGURE 6 shows yet another type of vane wheel 22.4 having vanes 26.4 between side walls 32, through which holes 34 may be provided. The vanes 26.4 have leading lips 40 extending circumferentially and have openings 30.4 at or near the boss 28. Recesses 29.3 are defined between adjacent vanes 26.4. If desired, a shroud 38.4 fast with the carrier, may be provided circumferentially around the wheel 22.4 on the leading side.

In FIGURES 4 to 6 the reference numeral 42 indicates the axis of the carrier.

By way of example, in operation, when the carrier 12 is rotated about its axis in the direction of arrow 44, and when the sun wheel is stationary or rotates at a speed less than the carrier speed, the vanes will intersect a layer of liquid 46 on the inner periphery of the drum 14 or 14.1, and liquid will enter the recesses between the vanes. When the planet wheel 24 rotates about its axis in the direction of arrow 48, relative to the carrier 12, the liquid will be entrapped between the vanes or between the vanes and the shroud on the leading side of the planet wheel axis relative to the direction of rotation of the carrier. Entrapped liquid is rejected axially through the openings 34 and/or through the openings 30, 30.2 and 30.4 to prevent it being carried over onto the trailing side of the vane wheel. This results in an unbalanced mass of liquid being entrapped on the leading side of the vane wheel. Due to rotation of the carrier about its axis, the unbalanced mass of entrapped liquid will be subjected to centrifugal force which will exercise a turning moment on the planet wheel 24 about its axis. This turning moment will be transmitted from the planet wheel onto the sun wheel 18 to provide a torque which may be used for driving a load.

When the sun wheel rotates at the same speed as the carrier, the planet wheel will be substantially stationary about its axis relative to the carrier, and the torque resulting from the unbalanced mass of liquid will be that available on the output shaft. The planet wheel may rotate only slowly to make up any leakage of the fluid from between the vanes, and shroud, if possible.

While the sun wheel is stationary or is rotating only slowly, the planet wheel will be rotating at a fast rate in the direction of arrow 48 relative to the carrier. Under the action of centrifugal force directed away from the planet wheel axis, liquid entering the recesses between the vanes, will be rejected through the radially directed openings between adjacent vanes in the direction of arrow 50. As rotation of the planet wheel about its axis relative to the carrier slows down, so the centrifugal force directed away from the planet wheel axis, becomes less and less until rejection of fluid takes place under the action of centrifugal force resulting from rotation of the carrier about its axis. Such rejection will taken place in a direction away from the carrier axis, through the openings 34 or through the openings 30.1, 30.2 and 30.4.

Figure 7:
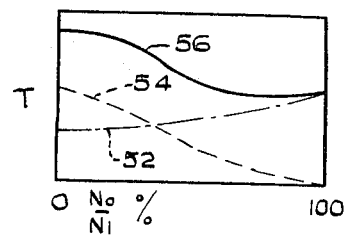
FIGURE 7 shows an example of torque-speed characteristic curves of a coupling in accordance with the invention.

The torque resulting from centrifugal force due to the rotation of the carrier about its axis, may be represented by the characteristic 52 in FIGURE 7. This FIGURE 7 shows how the torque T may vary with output speed No as a percentage of input speed Ni.

Apart from the torque developed about the planet wheel axis as a result of centrifugal force, as above described, a further torque is also developed which may be termed a "drag" or "dynamic" torque. When the planet wheel rotates about its axis relative to the carrier, while the output shaft is not yet up to speed, or when the vanes 26, 26.2, 26.3, 26.4, intersect the fluid layer 46, the vanes will impinge against the liquid in the layer 46 and displace it about the planet wheel axis. This will exercise a drag on the vanes which is transmitted to the planet wheels and thence to the sunwheel. This torque, resulting from the drag, is available to drive a load connected to the output shaft. When the sun wheel and output shaft are stationary, or when the difference between input and output speed is relatively large, this dynamic torque is significant. As the output shaft speeds up, so this drag torque diminishes in value. Referring to FIGURE 7, this drag torque characteristics is represented by line 54.

The output torque available on the output shaft is the combination of these component torques, and may be represented by the characteristic curve 56 in FIGURE 7. It will be noted that at start-up and while there is a relatively large difference between input and output speeds, the drag torque is most significant. However, as the output shaft speeds up and approaches input speed, i.e. as the speed of the vanes intersecting the fluid layer diminishes, so this drag torque diminishes and so the torque resulting from centrifugal force acting on the unbalanced mass of entrapped liquid, becomes more and more predominant. When the output shaft is up to full speed, the output torque is predominantly that resulting from centrifugal force acting on the unbalanced mass of liquid entrapped between the vanes of the vane wheel. It is therefore important that the vane wheel is adapted to entrap the maximum mass of unbalanced liquid at or near zero speed of the vane wheel about its axis relative to the carrier.

From the foregoing description it will be clear that the fluid filling from the fluid layer of the recesses between vanes, is supplemented by fluid bleeding back from recesses nearer the carrier axis. Thereby fluid is retained on the side of the liquid-entrapping wheel having the unbalanced mass of fluid. The openings 30, 30.1, 30.2, 30.4, may be staggered, if desired. The openings 34 through the side walls 32 supplement discharge from the recesses to prevent carry-over of liquid to the other side of the liquid-entrapping wheel and thereby decreasing the degree of unbalance.

It must be understood that the curves 52, 54 and 56 are intended to indicate the torque characteristics qualitatively and not quantitatively.

When the driven wheel is an internal gear instead of being externally toothed, shrouds, where necessary, will be provided on the trailing side of the vane wheels. Furthermore, the vanes will be disposed oppositely to that shown in the drawings, and the direction of rotation of the vane wheels 22, 22.1, 22.2 and 22.4 relative to the carrier, will be in a direction opposite to that shown by arrow 48. Furthermore, entrapment of liquid will take place on the trailing sides of the vane wheels.

What is claimed is:

1. A fluid torque transmitter having a carrier adapted for receiving a rotary power input and at least one planet wheel mounted on the carrier; a driven wheel co-axial with the carrier and drivingly connected to the planet wheel and adapted for connection to a power output; liquid-entrapping means which includes a liquid-entrapping wheel having outwardly extending vanes fast with and spaced circumferentially about a central boss which is co-axial and fast with the planet wheel, recesses being defined between adjacent vanes and axially spaced side walls being provided at the ends of and fast with the vanes; a reservoir in the form of a drum around the liquid-entrapping means and co-axial with the carrier and adapted to contain hydraulic fluid; the liquid-entrapping means being arranged to entrap liquid in the recesses from a peripheral layer set up in the drum under rotation of the carrier and to displace such entrapped liquid inwardly towards the rotational axis of the carrier against the action of centrifugal force, there being provided fluid rejection openings out of the recesses at the boss for reducing the carry-over of entrapped liquid from one side to the other side of the liquid-entrapping wheel when it rotates, so as to ensure the entrapment of an unbalanced mass of liquid on one side of the liquid-entrapping wheel relative to the direction of rotation of the carrier about its axis.

2. A fluid torque transmitter as claimed in claim 1, in which the fluid rejection openings are in the form of vane openings leading through the vanes from one recess to another.

3. A fluid torque transmitter as claimed in claim 2, in which the vanes have leading lips and are of forwardly curved section relative to the direction of rotation of the planet wheel about its axis relative to the carrier.

4. A fluid torque transmitter as claimed in claim 1, in which the fluid rejection openings are in the form of axial openings leading out of the recesses through at least one of the axially spaced side walls at the ends of the vanes.

5. A fluid torque transmitter as claimed in claim 4, in which the vanes have leading lips and are of forwardly curved section relative to the direction of rotation of the planet wheel about its axis relative to the carrier.

6. A fluid torque transmitter according to claim 4, in which the axial opening out of a recess is provided adjacent the leading vane of the two vanes defining the said recess, relative to the direction of rotation of the liquid-entrapping wheel about its axis relative to the carrier.

7. A fluid torque transmitter as claimed in claim 1, in which the fluid rejection openings are in the form of vane openings leading through the vanes from one recess to another, and in the formal of axial openings leading from the recesses through at least one of the axially spaced side walls at the ends of the vanes.

8. A fluid torque transmitter as claimed in claim 1, in which the vane openings are in the form of a series of axially spaced openings through each vane, the openings through each vane being staggered axially relative to those through an adjacent vane.

9. A fluid torque transmitter as claimed in claim 1, in which the vanes have leading lips and are of forwardly curved section relative to the direction of rotation of the planet wheel about its axis relative to the carrier.

References Cited

UNITED STATES PATENTS

| | | | |
|---|---|---|---|
| 1,666,152 | 4/1928 | Strigl | 74—774 |
| 2,205,329 | 6/1940 | Wohlenhaus | 74—774 |
| 2,293,547 | 8/1942 | Hobbs | 74—774 X |
| 2,468,964 | 5/1949 | Dunn et al. | 74—774 X |
| 3,251,248 | 5/1966 | Cancrinus | 74—752 |
| 3,261,233 | 7/1966 | Cancrinus | 74—752 X |
| 38,226 | 4/1863 | Holmes | 253—28 |
| 824,662 | 6/1906 | Kirchbach | 253—28 |
| 985,104 | 2/1911 | Beaver | 253—28 |
| 1,829,674 | 10/1931 | Rosenlocher | 253—76 |
| 2,314,572 | 3/1943 | Chitz | 230—120 |

FOREIGN PATENTS 982,135  1/1951  France.

DONLEY J. STOCKING, *Primary Examiner.*

THOMAS C. PERRY, *Assistant Examiner.*

U.S. Cl. X.R.

74—774